United States Patent
Rode

(10) Patent No.: US 6,327,773 B1
(45) Date of Patent: Dec. 11, 2001

(54) BEARING ASSEMBLY ADJUSTABLE SPACER AND GAGE PART ADJUSTMENT

(76) Inventor: John E. Rode, Persse Rd., Fonda, NY (US) 12068

( * ) Notice: Subject to any disclaimer, the term of this patent is extended or adjusted under 35 U.S.C. 154(b) by 0 days.

(21) Appl. No.: 09/290,847

(22) Filed: Apr. 13, 1999

(51) Int. Cl.[7] .................................................. B23P 19/04
(52) U.S. Cl. .......................... 29/724; 384/551; 384/583; 384/559
(58) Field of Search ................................ 29/724, 898.09, 29/898.03, 437, 445, 454, 283.5; 384/551, 556, 559, 563, 571, 583, 584; 267/158, 161

(56) References Cited

U.S. PATENT DOCUMENTS

| | | | |
|---|---|---|---|
| 4,067,585 | 1/1978 | Rode | 277/200 |
| 4,492,018 | * 1/1985 | Rode | 29/437 |
| 4,611,935 | * 9/1986 | Rode | 384/548 |
| 4,641,558 | * 2/1987 | Hoffmann | 83/152 |
| 5,549,397 | 8/1996 | Rode | 384/551 |
| 5,697,677 | * 12/1997 | Ruppert, Jr. et al. | 301/124.1 |
| 5,785,434 | * 7/1998 | Rode | 384/551 |
| 6,004,040 | * 12/1999 | Rode | 384/583 |
| 6,042,273 | * 3/2000 | Thrasher | 384/517 |
| 6,244,751 | * 6/2001 | Rode | 384/551 |

* cited by examiner

Primary Examiner—Tom Hughes
Assistant Examiner—Marc W. Butler
(74) Attorney, Agent, or Firm—Heslin Rothenberg Farley Mesiti P.C.

(57) ABSTRACT

One or more force application members (e.g., a force transmission member and/or a hydraulic force application member) may be employed to provide a desired adjustment (e.g., a preload and/or a compression) to an adjustable spacer of a bearing assembly. The hydraulic force application member may provide a first stage of the adjustment to the spacer, and the force transmission member may be threadingly rotated to apply a second stage of the adjustment to the spacer. An additional force application member may (e.g., contemporaneously) oppose at least one of the force application members in the providing of the adjustment to the spacer. This opposing force may cause a gap between certain surfaces (e.g., in a press) until the adjustment to the spacer is completed. The closure of the gap may serve to indicate the completion of the desired adjustment to the spacer. A housing rotatable on a portion of the bearing assembly may be prevented from rotating at the closure of the gap. Such an increased drag torque of the housing may be observed and employed to terminate an operation of at least one of the force application members. One or more gage parts may be located in the bearing assembly to assist the providing of the adjustment to the spacer. An adjustment of an axial dimension of at least one of the gage parts, may be made based on one or more factors and/or characteristics (e.g., endplay in the bearing assembly).

37 Claims, 8 Drawing Sheets

BEARING ASSEMBLY ADJUSTABLE SPACER AND GAGE PART ADJUSTMENT

CROSS-REFERENCE TO RELATED APPLICATIONS

This application contains subject matter which is related to the subject matter of the following applications, each of which is assigned to the same assignee as this application. The below-listed applications are hereby incorporated herein by reference in their entireties:

"BEARING ASSEMBLY ADJUSTABLE SPACER AND SYSTEM FOR ADJUSTING THE SAME," by John E. Rode, Ser. No. 09/108,514, filed Jul. 1, 1998;

"BEARING ASSEMBLY ADJUSTMENT GAGING SYSTEM," by John E. Rode, Ser. No. 09/130,166, filed Aug. 6, 1998 now U.S. Pat. No. 6,004,040; and "ADJUSTABLE SPACER HAVING A GENERALLY AXIALLY CURVED BEARING INTERFACE PORTION," by John E. Rode, Ser. No. 09/259,067, filed Feb. 26, 1999 now U.S. Pat. No. 6,244,751.

TECHNICAL FIELD

This invention relates, generally, to spindle mounted bearings and, more particularly, to adjustment of an adjustable spacer placed between such bearings mounted on a spindle, axle, shaft, or the like, as well as adjustment of a gage part and employment of the gage part for adjustment of the spacer.

BACKGROUND ART

Anti-friction bearings may serve to decrease friction between, for example, a stator and a rotor. For instance, such bearings may allow relative rotation between a housing and a spindle extending through the housing. The housing may comprise, for example, a hub. The spindle may comprise a shaft, axle, or the like. The bearings may comprise roller bearings, for example, tapered roller bearings. In one example, the tapered roller bearings may be employed in wheel hub and axle assemblies. In another example, the tapered roller bearings may be employed in devices such as motors, pumps, or speed reducers.

A typical tapered roller bearing may include a cone having an inner race for mounting on a spindle, a cup having an outer race for mounting in a housing, and a plurality of roller elements within a roller cage positioned between the inner and outer races. Commonly, a pair of such tapered roller bearings may be mounted on a spindle for rotation relative to or within a housing. Cooperating bearings, such as a pair of tapered roller bearings, may be included in a bearing assembly, for instance, of a motor, pump, speed reducer, or transmission assembly. In one example of "direct mounting" of the tapered roller bearings, the cups may be located in the bearing assembly axially outward relative to the cones. With exemplary "indirect mounting" of the tapered roller bearings, the cups may be located in the bearing assembly axially inward relative to the cones, as will be understood by those skilled in the art.

In order to properly secure bearings for operation, it is usually necessary to retain the bearings tightly under a predetermined axial tolerance or load on the spindle, for example, so that the bearings can maintain a proper running clearance of the roller elements under the influence of the combined axial and radial forces which the bearings are designed to support. Manufacturers of such assemblies often carefully measure the space between the bearing inner races, and provide a spacer of precisely the correct dimension and load requirements to fit therebetween. The spacer is typically made of ground steel tubing to a length tolerance of plus or minus one half of one thousandths of an inch. If the bearings are not maintained at a proper tolerance and/or load the bearings may not roll properly or may prematurely wear, particularly if the bearings are maintained at too high of a load, or may, if maintained under too low of a load, have excessive play causing failure of the bearings.

An exemplary configuration for an adjustable spacer is disclosed in U.S. Pat. No. 5,549,397 to John E. Rode (entitled "Adapter Sleeve and an Adjustable Spacer with Radial Extension Useable Thereon," issued Aug. 27, 1996, and assigned to Temper Corporation), which is hereby incorporated herein by reference in its entirety. In one embodiment, such an adjustable spacer may be of a type shaped as a ring for mounting between a pair of tapered bearings mounted on an axle or spindle to allow a load to be axially placed on the bearings. The adjustable spacer may include an extension located at a radius from an imaginary axis of the spacer, a contact means oriented radially outward from the extension, and a compressible area located between the contact means and the extension wherein the compressible area deforms when a predetermined load is applied to the ring in the axial direction. The adjustable spacer may be configured to be used with an adapter sleeve for use on axles or spindles of multiple radii.

In a further example, a deformable portion of such an adjustable spacer may be formed so that the spacer can be compressed axially and react with a generally constant force as described in U.S. Pat. No. 4,067,585 to John E. Rode (entitled "Deformable Metallic Element," issued Jan. 10, 1978, and assigned to Temper Corporation), which is hereby incorporated herein by reference in its entirety.

In addition, an illustrative configuration for a bearing assembly adjustment gaging system is disclosed in the above-incorporated Application Ser. No. 09/130,166. In one example, such an adjustment system may include a first gage part adjustably engaged (e.g., mated and/or threaded) with a second gage part. The gage parts may be employed in a (e.g., pressing) process of direct installation of bearings such as tapered roller bearings on a final assembly spindle as in a motor, pump and/or speed reducer shaft. Also, one or more of the gage parts may be employed in providing adjustments (e.g., a preload and/or an endplay setting) for an adjustable spacer during the same process of direct installation of the bearings. The gage parts may have various interfaces with the bearings, retainers, and/or housing portions, rotationally supported with respect to the spindle with the bearings. Further, the gage parts may serve to protect the bearings from paths of compression employed in the adjustments.

One technique for accomplishing such adjustment to the spacer by crushing the bearings together, sometimes using the gage parts, employs a mechanical press. The bearing assembly can usually be deemed to be correctly adjusted when a relatively light rolling drag force is detected to be present in the bearings, at which point it is typically important to stop further compression of the spacer before a relatively heavier rolling drag occurs.

For instance, the mechanical press may utilize a screw which is slowly driven to bring the plates or platens together under operator control. Such screw driven presses are usually larger and much more expensive than a hydraulic press of comparable capacity. However, a hydraulic press commonly has less accuracy and consistency of bearing adjustment than the screw driven press.

Thus, a need exists for improving ease, accuracy, performance, repeatability and/or control of adjustment to an adjustable spacer of a bearing assembly. A need also exists for decreasing the degree of operator judgment and/or skill required (e.g., by introducing automation and/or indicators, such as for mass production situations and/or arrangements) to properly adjust the spacer. An additional need exists for decreasing dimensional measurements required to properly prepare a bearing assembly and/or a spacer thereof. Another need exists for the adjustable spacer to allow a desired adjustment to be provided for the bearing assembly.

SUMMARY OF THE INVENTION

Pursuant to the present invention, shortcomings of the existing art are overcome and additional advantages are provided through the provision of bearing assembly adjustable spacer and gage part adjustment.

In one aspect of the invention, a bearing assembly adjustable spacer adjustment system includes a hydraulic force application member and a force transmission member. The hydraulic force application member is abuttable with a retainer receivable by a bearing portion of a bearing assembly. The bearing assembly includes an adjustable spacer. The bearing assembly is supported with a base. The force transmission member is abuttable with the retainer. A first movement of the hydraulic force application member, toward the base and by an operation of the hydraulic force application member when the hydraulic force application member abuts the retainer and when the retainer is received by the bearing portion, causes a first stage of a desired adjustment to be provided to the adjustable spacer. A second movement of the force transmission member, toward the base and by a threaded rotation of the force transmission member when the force transmission member abuts the retainer and when the retainer is received by the bearing portion, causes a second stage of the desired adjustment to be provided to the adjustable spacer.

The force transmission member can include a first threaded portion. The system can further include an interconnector having a second threaded portion engaged with the first threaded portion of the force transmission member. The interconnector can be fixedly connected with the base and/or a portion of the hydraulic force application member.

The force transmission member can include an elongate member connected with an arm portion extending transversely relative to the elongate member. The arm portion can be configured to be operated to rotate the elongate member in driving the rotation of the force transmission member. The hydraulic force application member can include a hydraulic sleeve having a passage therethrough. The force transmission member can include an elongate member having a portion located in the passage.

The base can support a stem. A section of the stem can receive a second bearing portion of the bearing assembly. The base can include a surface portion having a recess receiving a second section of the stem. The hydraulic force application member can be operatively arranged effectively substantially in parallel with the force transmission member.

A housing portion of a housing can be rotatable on a second bearing portion of the bearing assembly contemporaneously with a portion of the second movement of the force transmission member. The adjustment can include a preload, an adjustment to an axial dimension of the spacer, and/or a compression.

The system can further include a flow regulator in fluid communication with the hydraulic force application member. The flow regulator can be configured to substantially limit force, provided to the spacer by the operation of the hydraulic force application member, to a level less than required, without the second movement of the force transmission member, to cause the providing of the second stage of the adjustment to the spacer.

The system can further include a gage part locatable between the bearing portion and the spacer. The first movement of the hydraulic force application member and the second movement of the force transmission member, when the retainer is received by the bearing portion and when the gage part is located between the bearing portion and the spacer, can cause force to be transmitted through the gage part in the providing of the first and second stages of the adjustment to the spacer.

The system can further include a first gage part, a second gage part, and a second force application member. The first gage part can include a first gage section, a second gage section, and a first surface portion located between the first gage section and the second gage section. The first gage section of the first gage part can receive a first bearing part coupled with the bearing portion. The second gage part can include a third gage section and a fourth gage section. The third gage section of the second gage part can abut the bearing portion. The fourth gage section of the second gage part can abut the spacer. The second force application member can include a second surface portion. The second movement of the force transmission member, in a first direction toward the base and when the force transmission member abuts the retainer, contemporaneous with a second operation of the second force application member, in a second direction generally opposite the first direction and with the second surface portion abutting the first surface portion generally in the second direction, can cause a gap, between the second section of the first gage part and a second bearing part supported with said base, until a completion of the providing of the second stage of the adjustment to the spacer.

The system can further include a drive element. The drive element can be coupled with a housing rotatable on a second bearing portion of the bearing assembly. The housing can abut the second bearing part. The drive element can include a portion configured to slip at an increase in drag torque of the housing resulting from a closure of the gap between the second section of the first gage part and the second bearing part. The system can further include a rotation observation unit. The rotation observation unit can be coupled with the housing and configured to provide an indication after sensing a decrease in frequency of rotation of the housing.

The invention also contemplates a bearing assembly adjustable spacer adjustment method. A hydraulic force application member is hydraulically moved toward a base and against a retainer. The base supports a bearing assembly. The retainer is received by a portion of the bearing assembly. The hydraulic movement of the hydraulic force application member causes a first stage of a desired adjustment to be provided to an adjustable spacer of the bearing assembly. A force transmission member is threadingly moved toward the base and against the retainer to cause a second stage of the desired adjustment to be provided to the adjustable spacer.

The movement of the force transmission member can be halted upon a completion of the providing of the second stage of the adjustment to the spacer. The completion of the providing of the second stage of the adjustment can be indicated by a sensed increase in drag torque of a housing rotatably connected with a second portion of the bearing assembly.

In another aspect, a bearing assembly adjustment system includes a first gage part and a second gage part. The first gage part includes a first gage section, a second gage section, and a first surface portion located therebetween. The first gage section receives a first bearing part coupled with a bearing portion of a bearing of a bearing assembly. The bearing portion of the bearing receives a retainer abuttable with a first force application member. The bearing assembly includes an adjustable spacer. The bearing assembly is supported with a base. The second gage part includes a third gage section and a fourth gage section. The third gage section abuts the bearing portion of the bearing. The fourth gage section abuts the adjustable spacer. The system further includes a second force application member having a second surface portion. A first operation of the first force application member, in a first direction toward the base and when the first force application member abuts the retainer, contemporaneous with a second operation of the second force application member, in a second direction generally opposite the first direction and with the second surface portion of the second force application member abutting the first surface portion of the first gage part generally in the second direction, causes a gap, between the second section of the first gage part and a second bearing part supported with the base, until a desired compression is provided to the adjustable spacer.

The compression can include a preload of the spacer and/or an adjustment to an axial dimension of the spacer. The coupling of the first bearing part with the bearing portion of the bearing can include a rotatable connection of the first bearing part with the bearing portion.

The first operation of the first force application member contemporaneous with the second operation of the second force application member, upon a completion of the providing of the compression to the spacer, can cause the second section of the first gage part to abut the second bearing part. The abutting of the second surface portion of the second force application member with the first surface portion of the first gage part can substantially prevent rotation, contemporaneous with this abutting, of the first gage part relative to an axis of the first gage part.

The bearing portion of the bearing and the second bearing part can comprise the bearing of the bearing assembly. The bearing portion of the bearing and the first bearing part can comprise the bearing of the bearing assembly. The second surface portion of the second force application member can comprise a flange portion of the second force application member. The first surface portion of the first gage part can comprise a flange portion of the first gage part.

The third gage section of the second gage part can include a shoulder portion that receives the bearing portion of the bearing of the bearing assembly. The second force application member can include a drive unit, an elongate member, a plate, a resilient member, and a stop. The drive unit can be operatively connected with the elongate member. The plate can include the second surface portion and a plate part having a passage therethrough. A portion of the elongate member can be located in the passage. The stop can be connected with the elongate member. The resilient member can be located between the plate and the stop, and the resilient member can be in abutment with the plate and/or the stop.

The spacer can abut a second bearing portion of a second bearing of the bearing assembly. The second bearing portion of the second bearing can be received by a stem supported with the base. The second bearing portion can be rotatably connected with a third bearing portion of the second bearing. The third bearing portion can receive a first housing portion of a housing. The second bearing part can be received by a second housing portion of the housing. The housing can be, contemporaneously with the first operation of the first force application member and/or contemporaneously with the second operation of the second force application member, rotatable, in the gap and on the second bearing, until a completion of the providing of the compression to the spacer. The system can further include a rotation sensing unit operatively coupled with the housing.

The system can further include a drive element drivingly coupled with the housing. The drive element can include a portion configured to slip at an increase in drag torque of the housing resulting from a closure of the gap between the second section of the first gage part and the second bearing part. The increase in drag torque can correspond to a completion of the providing of the compression to the spacer. The system can further include a rotation observation unit coupled with the housing. The rotation observation unit can be configured to provide an indication after sensing a decrease in rotation frequency of a housing. The indication provided by the rotation observation unit can be employed to terminate the first operation of the first force application member. The rotation observation unit can be configured to generate a signal to control a portion of the first force application member. The first operation of the first force application member can include a threaded rotation and/or a hydraulic movement of a portion of the first force application member.

The invention further contemplates a bearing assembly gage part adjustment method. A first endplay of a bearing assembly is determined. The bearing assembly includes an adjustable spacer. A second endplay of the bearing assembly is determined when a gage part is located in the bearing assembly. An axial dimension of the gage part is adjusted based on a difference between the second endplay and the first endplay.

The difference between the second endplay and the first endplay can comprise a first difference. The adjusting of the axial dimension of the gage part can be further based on a second difference between the first difference and a springback characteristic of the spacer. The adjusting of the axial dimension can be still further based on a third difference between the second difference and a preload specified for the spacer. In addition, the adjusting of the axial dimension of the gage part can be further based on a sum of the second or third difference and an assembly compression specified for the spacer.

The adjusting of the axial dimension of the gage part can be further based on a second difference between the first difference and a preload specified for the spacer. Also, the adjusting of the axial dimension of the spacer can be still further based on a sum of the second difference and an assembly compression specified for the spacer.

The adjusting of the axial dimension of the gage part can be further based on a sum of the difference between the second endplay and the first endplay and an assembly compression specified for the spacer. The adjusting of the axial dimension of the gage part can comprise a decreasing of the axial dimension of the gage part.

In a combination of the method with a bearing assembly adjustable spacer adjustment method, the adjusted axial dimension of the gage part can be employed in providing a desired adjustment to the adjustable spacer.

Thus, the present invention advantageously provides a system that improves accuracy, assembly, efficiency, support performance, and/or effectiveness of an adjustable spacer of a bearing assembly. The invention also increases the repeatability, ease, accuracy, consistency, quality, and/or controllability of adjustment and/or force application to the spacer. Further, the present invention decreases skill, attention, judgment, and/or sophistication required of an operator in providing the adjustment to the spacer. In addition, the invention improves ease, efficiency, and/or accuracy of adjustment to a gage part usable in adjusting the spacer.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention will be readily understood from the following detailed description of preferred embodiments taken in conjunction with the accompanying drawings in which:

BEST MODE FOR CARRYING OUT THE INVENTION

In accordance with the principles of the present invention, applications of force by hydraulics and/or threaded rotation are employed in providing a desired adjustment to an adjustable spacer of a bearing assembly.

Figure 1:
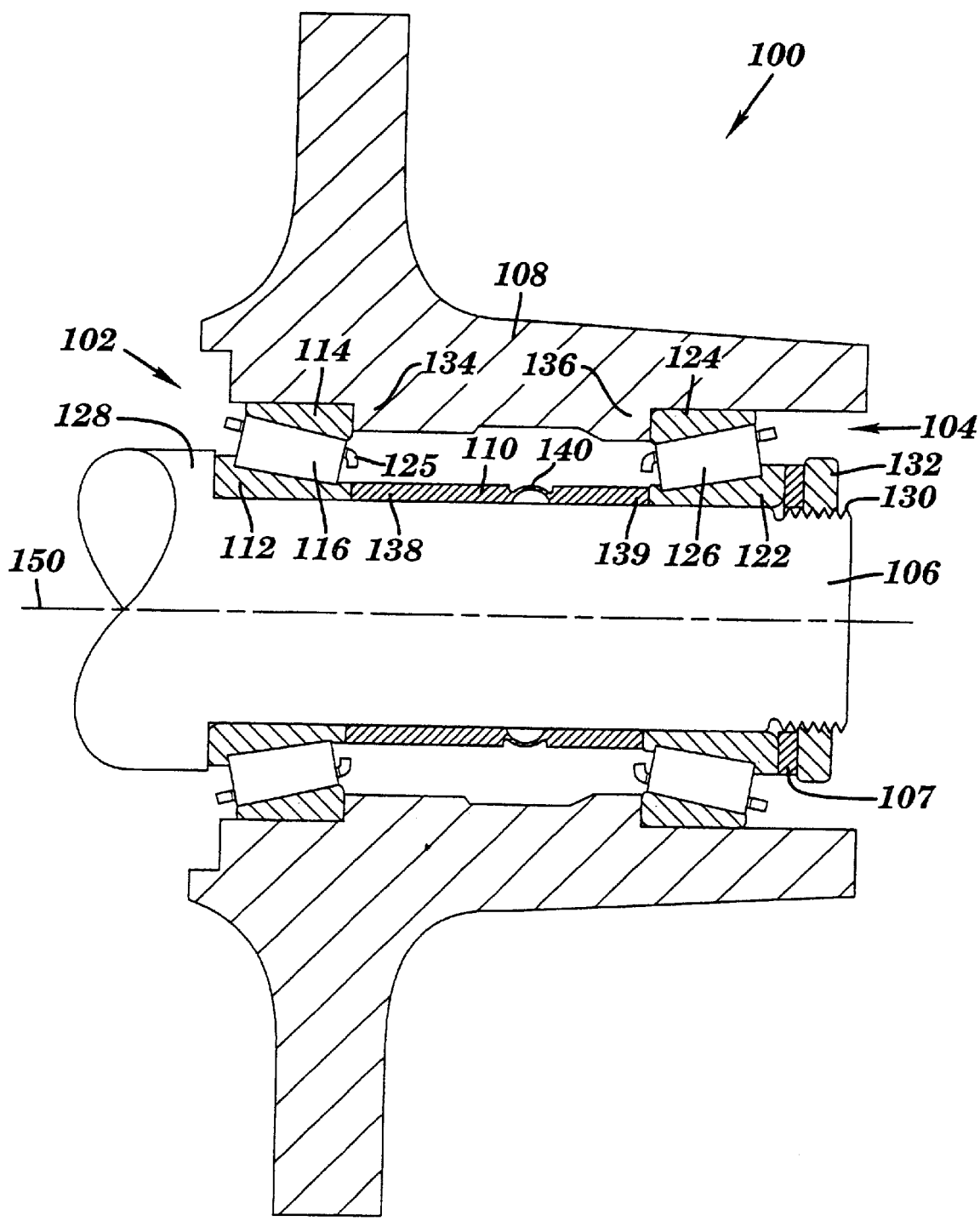
FIG. 1 is a cutaway, sectional, partial, side view of one example of an adjustable spacer in a bearing assembly located between a spindle and a housing.

Referring to FIG. 1, bearing assembly 100 may include first bearing 102 and second bearing 104. The bearings may be mounted on a shaft or spindle 106. The spindle may comprise, for example, a central member (e.g., an axle, a shaft, and/or the like) that may rotate within a bearing portion. For instance, the spindle may comprise an axle of a vehicle or a shaft of a motor or speed reducer. Also, the central member may remain stationary and an outer housing or (e.g., wheel) hub 108 may rotate thereabout. In one example, the bearings may include a pair of identical but opposed tapered roller bearings. In addition, one or more of the bearings may comprise an unsealed or a sealed bearing. For example, the bearing 104 may comprise a sealed bearing which may employ a (e.g., grease) seal 107.

Still referring to FIG. 1, bearings 102 and 104 may support a housing or (e.g., wheel) hub 108. For example, the hub may support a part of a wheel or tire (not shown). Adjustable spacer 110 may be located axially between the bearings, and radially between spindle 106 and the hub or housing 108. The adjustable spacer may include deformable portion 140.

Further referring to FIG. 1, deformable portion 140 of adjustable spacer 110 may serve to allow adjustment to, for instance, axial length of the adjustable spacer, and/or any number of other characteristics and/or behaviors of the adjustable spacer. For example, adjustment to the deformable portion of the adjustable spacer may allow preloading of bearing assembly 100. Preloading of the adjustable spacer may serve to provide a proper axial loading on the bearing assembly, including the adjustable spacer, to obtain optimal performance and/or maximal life, with substantial elimination of play in the bearings. In one example, the desired adjustment to the adjustable spacer may include an adjustment to an axial dimension of the spacer and/or a compression of the deformable portion 140 of the adjustable spacer.

Exemplary configurations for adjustable spacer 110 are presented herein, with further detail and discussion of exemplary feature(s) for the adjustable spacer being disclosed in the above-incorporated applications Ser. Nos. 09/108,514, 09/130,166, and 09/259,067 and U.S. Pat. Nos. 4,067,585 and 5,549,397. An illustrative description of adjustment applicable and/or extendible to a number of such adjustable spacers is presented herein.

Again referring to FIG. 1, bearing 102 may comprise a tapered roller bearing that may include inner race 112 mounted on spindle 106, outer race 114 mounted in housing 108, and roller elements 116 positioned between the inner race 112 and the outer race 114. Bearing 104 may comprise a tapered roller bearing that may include inner race 122 mounted on the spindle, outer race 124 mounted in the housing, and roller elements 126 positioned between the inner race 122 and the outer race 124. The bearing 102 and/or the bearing 104 may employ a roller cage 125 in order to hold the corresponding roller elements 116, 126 in proper position between the corresponding inner and outer races. For explanatory purposes, FIG. 1 depicts indirect mounting of the bearings. That is, outer race (e.g., cup) 114 may be located in bearing assembly 100 axially inward of inner race (e.g., cone) 112 of the bearing 102. Further, outer race (e.g., cup) 124 may be located in the bearing assembly 100 axially inward of inner race (e.g., cone) 122 of the bearing 104. In another example, direct mounting of the bearings may be employed, as will be appreciated by those skilled in the art. An exemplary direct mounting of bearings is disclosed in the above-incorporated application Ser. No. 09/130,166.

Referring still to FIG. 1, axial as well as radial support may be provided among various components of bearing assembly 100. For instance, outer race 124 of bearing 104 may provide axial support for housing 108, while also providing radial support thereto, such as for positioning thereof. Furthermore, the housing may be formed to abut outer race 114 of the bearing 102 along axial as well as radial surfaces. Such formation and/or positioning may allow alignment, support, and/or force transfer along a selected number of paths and/or with a selected number of interfaces, as will be understood by those skilled in the art.

Figure 2:
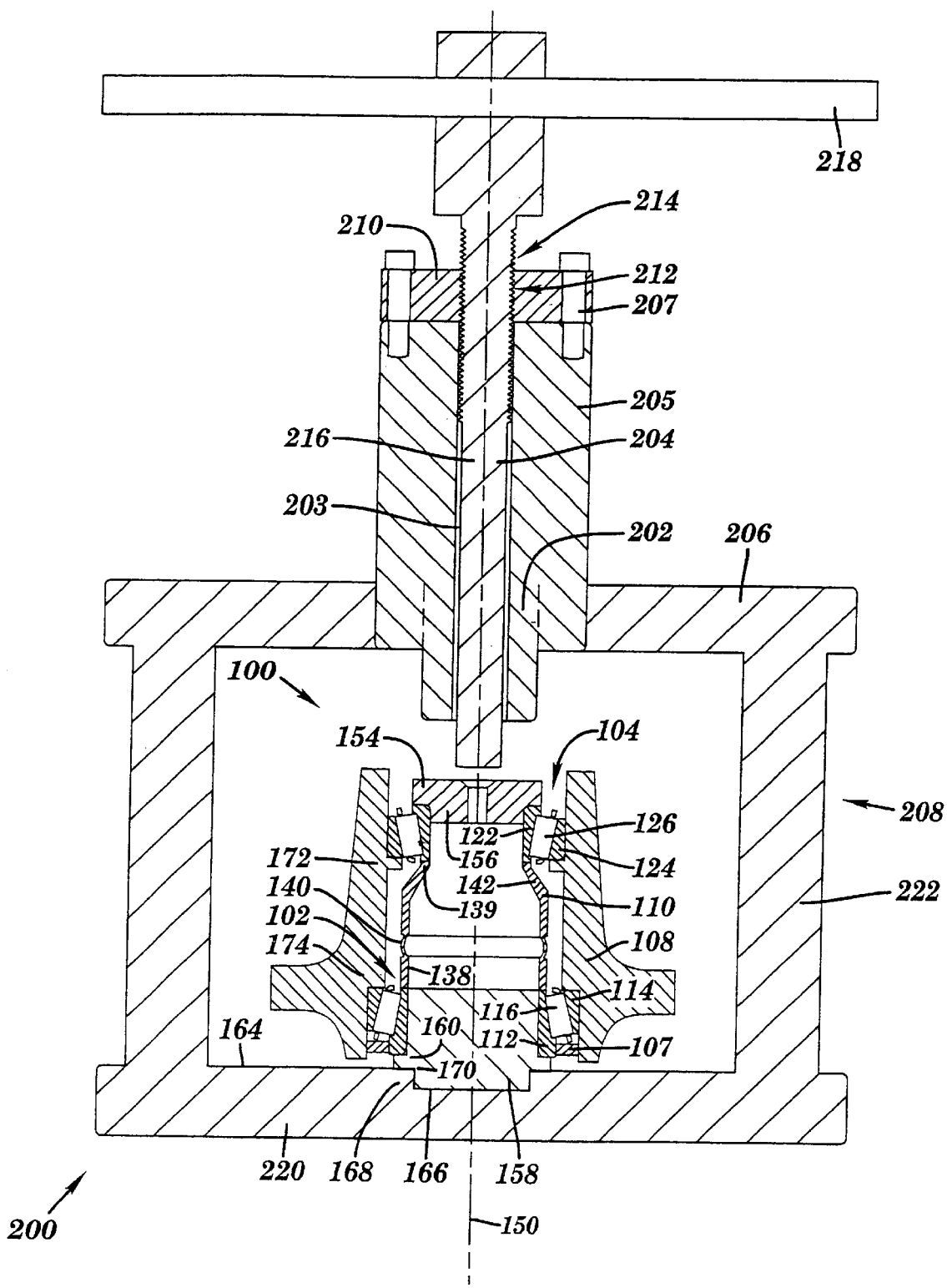
FIG. 2 is a cutaway, sectional, partial, elevation, side view of one example of a system for adjusting an adjustable spacer of a bearing assembly, illustrating a hydraulic force application member configured for hydraulic operation and a force transmission member configured for threaded rotation.
Figure 6:
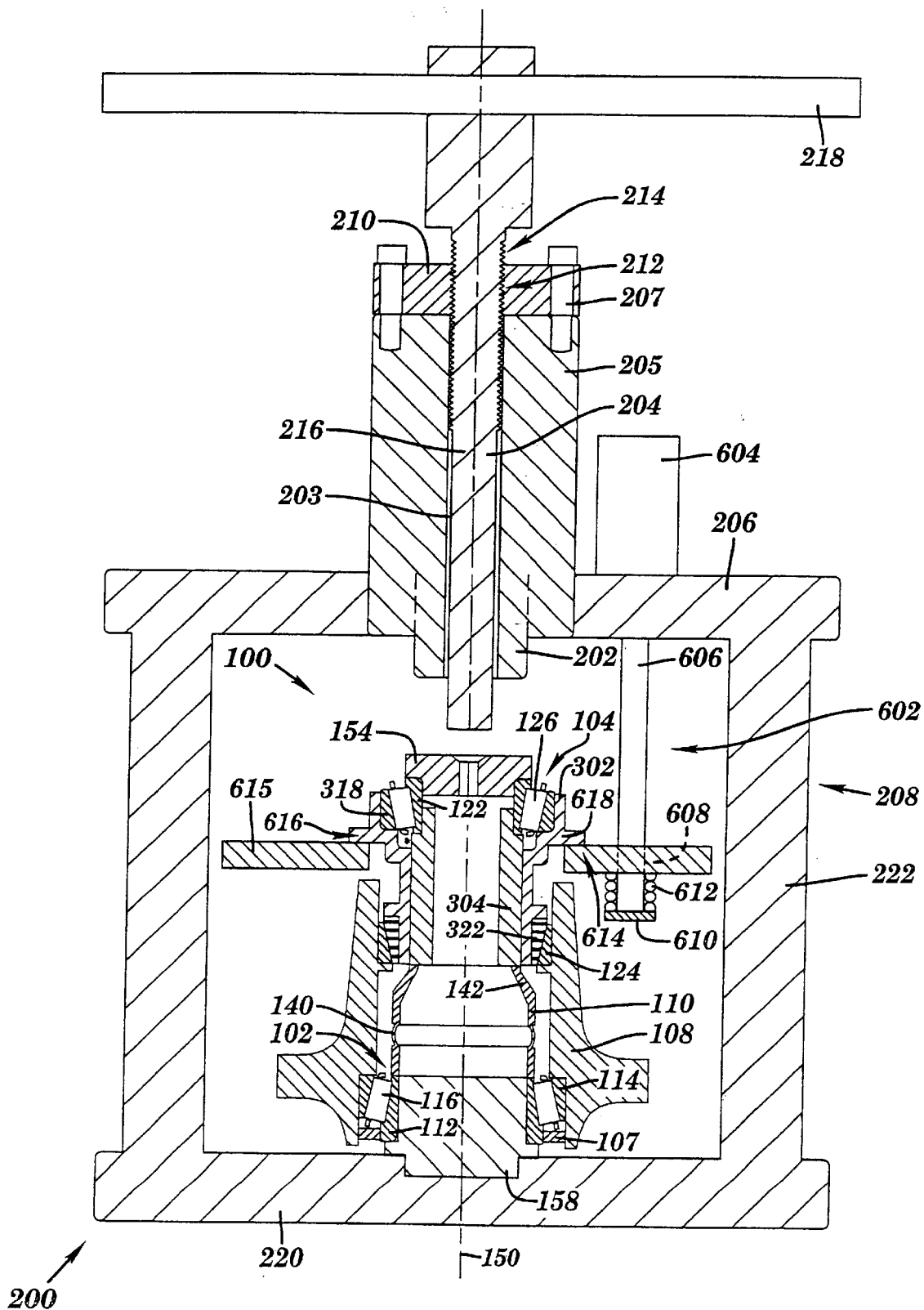
FIG. 6 is a cutaway, sectional, partial, elevation, side view of one example of a system for adjusting an adjustable spacer of a bearing assembly, illustrating a hydraulic force application member configured for hydraulic operation and a force transmission member configured for threaded rotation, with gage parts located in the bearing assembly, and with a second force application member abutting a surface portion of one of the gage parts.
Figure 7:
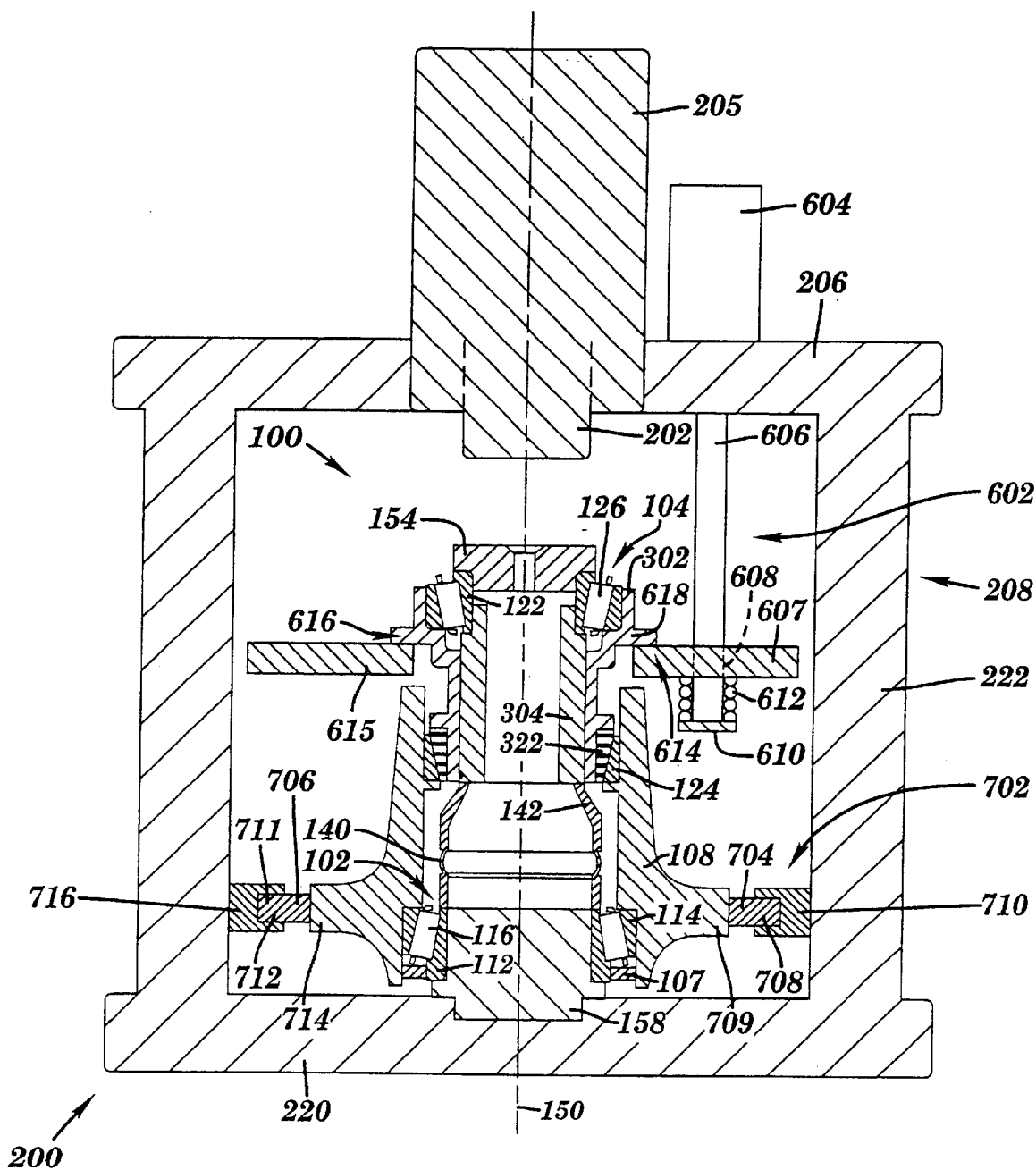
FIG. 7 is a cutaway, sectional, partial, elevation, side view of one example of a system for adjusting an adjustable spacer of a bearing assembly, illustrating a hydraulic force application member configured for hydraulic operation and a force transmission member configured for threaded rotation, with gage parts located in the bearing assembly, with a second force application member abutting a surface portion of one of the gage parts, and with a rotation monitoring unit coupled with a housing rotatably connected with a portion of the bearing assembly.

In one example, additionally referring to FIG. 1, housing 108 may include inner shoulder 134 and outer shoulder 136. The inner shoulder may serve to receive outer race 114 of bearing 102. The outer shoulder may serve to receive outer race 124 of bearing 104. Adjustable spacer 110 may include a first end 138 and a second end 139. For instance, the end 138 may axially abut inner race 112 of bearing 102, and may radially abut a first location on spindle 106. The end 139 may axially abut inner race 122 of bearing 104, and may axially abut a second location on the spindle. The adjustable spacer 110 may include at least one flange 142 (FIGS. 2 and 6–7). The flange may serve to allow, for instance, positioning of bearing 102 about a first diameter of spindle 106 which is different from a second diameter of the spindle about which the bearing 104 is mounted. Such flange(s) may be formed at any appropriate location(s) of the adjustable spacer, and/or with respect to any appropriate location(s) of, for instance, the spindle, as will be appreciated by those skilled in the art. In addition, spindle 106 may include shoulder 128 for receiving inner race 112 of bearing 102. Furthermore, the spindle may include screw thread(s) 130 for receiving fastener (e.g., nut) 132. The fastener (e.g., nut) may thus be tightened, such as to abut inner race 122 of bearing 104, for cooperative provision of axial support among bearing assembly 100 (including adjustable spacer 110), housing 108, and spindle 106.

Referring again to FIG. 1, housing 108 may be mounted about outer races 114 and 124 for rotation of the housing about spindle 106, with roller elements 116 positioned between the outer race 114 and inner race 112, roller elements 126 positioned between the outer race 124 and inner race 122, and the inner races mounted on the spindle. In another example, the spindle may rotate within the housing. That is, the spindle and/or the housing may serve as, and/or resemble, a stator and/or a rotor, as will be appreciated by those skilled in the art.

Turning to FIG. 2, system 200 may include a plurality of force application members. One example of the plurality of force application members may include a hydraulic force application member 202 and a force transmission member 204. For instance, the hydraulic force application member may comprise a hydraulic sleeve and/or cylinder, which may have a (e.g., approximately 1 to 1.25 inch diameter) hollow 203 therein and/or therethrough. For example, the hydraulic force application member may comprise about a 20 ton cylinder at approximately 10,000 p.s.i. The construction, operation, and use of hydraulic cylinders and hollow hydraulic cylinders is well-known in the art. In addition, the force transmission member may comprise a (e.g., approximately 1 to 1.25 inch diameter, and about 12 threads per inch lead, as in a 1.25–12 unified national thread) screw. The construction, operation, and use of screws is well-known in the art. The screw may be, for instance, concentrically (e.g., relative to axis 150) arranged in the hollow 203 of the hydraulic force application member (e.g., cylinder). In another example, two or more separate hydraulic force application members (e.g., cylinders, not shown) may be arranged alongside and/or parallel to a (e.g., central) force transmission member (e.g., screw).

Referring to FIG. 2, hydraulic force application member 202 may be connected and/or supported with a platform (e.g., plate) 206 of a press 208. For instance, a casing 205 of the hydraulic force application member may be received by and/or attached to the platform. Numerous configurations for such a press may be employed, for example, solid steel welded, non-adjustable, or multi-post adjustable frames.

Referring again to FIG. 2, hydraulic force application member 202 may be (e.g., fixedly) connected with an interconnector (e.g., collar) 210. In one example, at least one bolt 207 may serve to attach the interconnector to casing 205 of the hydraulic force application member. The interconnector may include one or more first threads 212 for (e.g., threaded) engagement with one or more second threads 214 of force transmission member 204. The force transmission member may comprise an elongate member 216 formed (e.g., integrally) with the threads 212. The elongate member may be (e.g., fixedly) connected with an arm 218. The arm may extend transversely relative to the elongate member 216, such as for operation (e.g., driving, impelling, propelling, pushing, and/or manipulation) to rotate the elongate member 216. For example, a first (e.g., clockwise, such as when viewed from above) rotation of the elongate member 216 may (e.g., threadingly) advanced the force transmission member toward bearing assembly 100 and/or a base 220 of press 208. Further, a second (e.g., counterclockwise, such as when viewed from above) rotation of the elongate member 216 may (e.g., threadingly) retract the force transmission member away from the bearing assembly and/or the base 220 of the press 208.

Still referring to FIG. 2, hydraulic force application member 202 and/or force transmission member 204 may (e.g., selectively) abut a retainer 154 receivable by (e.g., a portion of) bearing 104. The retainer may include a shoulder 156 for (e.g., axially and/or radially) abutting inner race 122 of the bearing 104. The inner race 122 of the bearing 104 may (e.g., axially) abut end 139 of spacer 110. In addition, end 138 of the spacer may (e.g., axially) abut inner race 112 of bearing 102. The bearing 102 may be received by a stem 158. For instance, the inner race 112 of the bearing 102 may be (e.g., axially and/or radially) received by a shoulder 160 of the stem. The stem may be supported with base 220 of press 208. For example, the base may include a surface 164 having a recess (e.g., groove) 166 forming a shoulder 168 for (e.g., axially and/or radially) abutting a shoulder 170 of the stem. The recess 166 may serve to guide bearing assembly 100 in a certain (e.g., central and/or symmetrical) alignment and/or arrangement (e.g., relative to axis 150). In one example, the base may be (e.g., fixedly) connected with platform 206 using at least one structural member (e.g., bolt) 222.

Again referring to FIG. 2, outer race 124 of bearing 104 may be (e.g., axially and/or radially) received by a shoulder 172 of housing 108. In addition, a shoulder 174 of the housing may be (e.g., axially and/or radially) received by outer race 114 of bearing 102.

Referring still to FIG. 2, an exemplary description of an illustrative operation of system 200 is now presented for explanatory purposes. Stem 158 may be positioned in recess 166 of base 220 in press 208. Inner race 112, having roller elements 116 thereon, may be placed on the stem. Housing 108, with outer races 114 and 124 positioned therein, may be placed over the roller elements 116 (e.g., by coupling the outer race 114 therewith). In one example, the housing may be rotated (e.g., spun), such as for seating the roller elements 116. End 138 of spacer 110 may be placed on the inner race 112. In addition, inner race 122, having roller elements 126 coupled therewith and/or therein, may be placed on end 139 of the spacer. Retainer 154 may be placed on the inner race 122. The retainer may be pressed toward the base of the press, while rotating (e.g., turning and/or spinning) the housing, such as for providing a desired adjustment (e.g., a preload and/or a compression) to the spacer. This pressing of the retainer toward the base may be stopped (e.g., halted) as soon as a relatively light turning drag of the housing is sensed. In one example, the relatively light turning (e.g., turning) drag (e.g., torque) of the housing may result from a closure (e.g., of one or more gaps) among a plurality of portions of bearing 104. For instance, the relatively light rolling (e.g., rotating and/or turning) drag (e.g., torque) may result from a closure (e.g., of a gap) between roller elements 126 and outer race 124. This sensing of the relatively light rotating (e.g., turning) drag (e.g., torque) of the housing may serve to indicate a completion of the providing of the desired adjustment to the spacer. Additional discussion of the pressing of the retainer toward the base, is presented herein.

Further referring to FIG. 2, pressing of retainer 154 to provide the desired adjustment to spacer 110, in one example, may be performed by a combination and/or cooperation of hydraulic force application member 202 and force transmission member 204. A first movement of the hydraulic force application member against retainer 154 and/or toward base 220 may provide a first stage of the desired adjustment (e.g., preload and/or compression) to spacer 110. A second movement of the force transmission member against the retainer 154 and/or toward the base 220 may provide a second stage of the desired adjustment to the spacer. For example, (e.g., a portion of) the first movement of the hydraulic force application member may precede (e.g., a portion of) the second movement of the force transmission member. In addition, the first movement of the hydraulic force application member may comprise an extension operation of the hydraulic force application member, causing the hydraulic force application member to extend toward the base 220 and press the retainer against inner race 122 to transmit force to the spacer 110, supported with inner race 112 received by stem 158 on the base. For instance, this extension operation of the hydraulic force application member against the retainer 154 and/or toward the base 220, may provide about 80 to 90 percent of the force required to provide the adjustment to the spacer.

Referring again to FIG. 2, the second movement of force transmission member 204 to provide the second stage of the adjustment to the spacer 110, may comprise a threaded rotation of the force transmission member, causing the force transmission member to extend toward base 220 and press retainer 154 further against inner race 122 to transmit additional force to the spacer 110. In one example, this threaded advancement of the force transmission member against the retainer 154 and/or toward the base 220, may provide the remaining about 10 to 20 percent of the force required to provide the adjustment to the spacer.

Referring still to FIG. 2, an example is now presented as an illustration of an advantage of the invention. An operator (e.g., using a simple hand pump) may cause hydraulic force application member 202 to provide the bulk (e.g., about 80 to 90 percent) of the required force for adjusting (e.g., preloading and/or compressing) the spacer 110. Then, the operator need only move (e.g., turn and/or threadingly rotate) force transmission member 204 to provide about 3000 pounds of additional force for accurately achieving (e.g., completing) the adjustment to the spacer. A typical torque required to turn a screw (e.g., comprising the force transmission member), may be about 50 foot pounds. A typical operator may accomplish this task relatively easily.

However, without the first movement of hydraulic force application member 202 to obtain the first stage (e.g., 80 to 90 percent) of the adjustment to spacer 110, the operator would need to apply about 750 foot pounds to move (e.g., turn and/or threadingly rotate) force transmission member 204 (e.g., screw) in order to fully complete the (e.g., first and second stages of) adjustment to the spacer. That feat, without first applying the hydraulic force, may be extremely difficult for the operator to accomplish, and may require special high strength alloy materials for a screw adjusting mechanism and/or a use of ball bearing screws (not shown). As will be understood by those skilled in the art, since ball bearing screws typically have fast lead angles and are relatively large (e.g., 1.5 inch diameter with 2 or 4 threads per inch lead), accurate adjustment of the spacer may be made more difficult without a substantial drive reduction (e.g., with a worm gear reduction drive), which may increase expense and/or time for moving relatively long axial distances, as may be needed to open and close press 208 between assembly operations.

Advantageously, the accomplishment of the first stage of the desired adjustment to spacer 110 by hydraulic force application member 202, with the accomplishment of the second stage of the desired adjustment performed by force transmission member 204, may improve consistency, accuracy, repeatability, and/or effectiveness of the adjustment to the spacer 110. This may be particularly desirable in mass production situations. Testing has demonstrated the repeatability of adjustment to the spacer may be improved from a variance of about 0.004 inches by use of hydraulics alone, to about 0.0004 to 0.0005 inches with the adjustment made by the combination and/or cooperation of the hydraulic force application member and the force transmission member (e.g., the hydraulically assisted screw).

Figure 3:
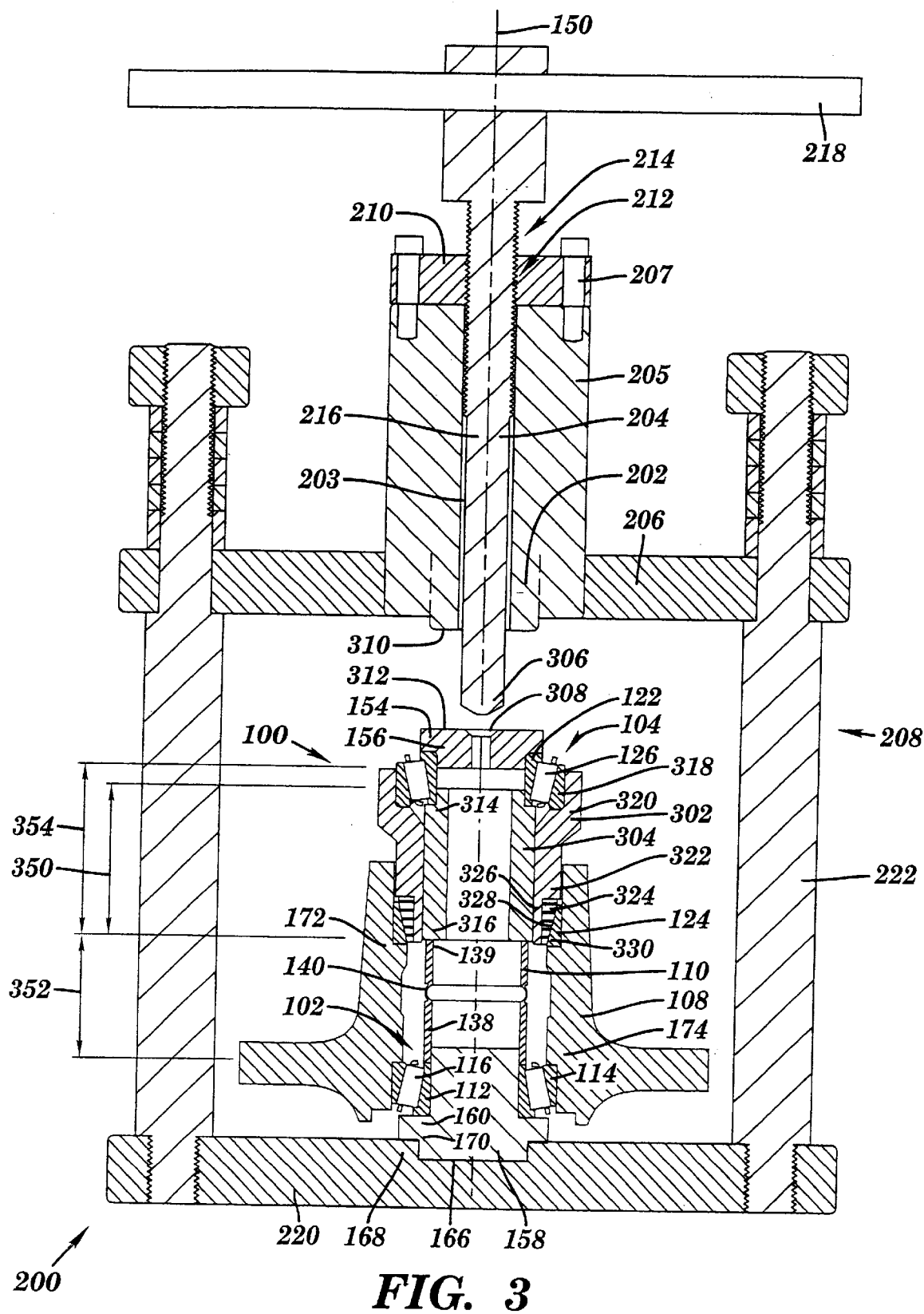
FIG. 3 is a cutaway, sectional, partial, elevation, side view of one example of a system for adjusting an adjustable spacer of a bearing assembly, illustrating a hydraulic force application member configured for hydraulic operation and a force transmission member configured for threaded rotation, with gage parts located in the bearing assembly.

Turning to FIG. 3, system 200 may include a first gage part (e.g., cup extender and/or outer wheel hub extension gage) 302 and/or a second gage part (e.g., cone extender and/or inner wheel hub extension gage) 304. The first and second gage parts may be located (e.g., inserted and/or placed) in bearing assembly 100, as described herein. For instance, one or more of the gage parts may serve (e.g., cooperate) to allow the desired adjustment (e.g., preload and/or compression) to be provided to adjustable spacer 110. In one example, the gage parts may contribute to providing of the desired adjustment to the spacer, without requiring complete assembly of bearing 104 and/or installation of the bearing 104 in housing 108.

Referring to FIG. 3, force transmission member 204 may include a first interface portion 306 (e.g., geometrically and/or angularly) shaped to receive (e.g., engage and/or mate with) a (e.g., correspondingly and/or cooperatively shaped) second interface portion 308 of retainer 154, such as for effective force transmission therebetween. In addition, hydraulic force application member 202 may include a third interface portion 310 and the retainer may include a fourth interface portion 312, with the third and fourth interface portions (e.g., geometrically and/or planarly) shaped for effective force transmission therebetween. For instance, the retainer may comprise the fourth interface portion 312 located peripherally relative to the second interface portion 308.

Referring still to FIG. 3, retainer 154 may include shoulder 156 for (e.g., axially and/or radially) abutting inner race 122 of bearing 104. The inner race 122 of the bearing 104 may (e.g., axially and/or radially) abut first section 314 of second gage part 304. In addition, second section 316 of the second gage part may (e.g., axially) abut end 139 of spacer 110. In addition, end 138 of the spacer may (e.g., axially) abut inner race 112 of bearing 102. The bearing 102 may be received by (e.g., shoulder 160 of) stem 158. The stem may be supported with (e.g., shoulder 168 of) base 220 of press 208.

Again referring to FIG. 3, bearing part (e.g., extra and/or auxiliary outer race and/or cup) 318 may (e.g., rotatingly) receive roller elements 126 coupled with inner race 122 of bearing 104. The bearing part 318 may be received by first gage part 302. For instance, the bearing part 318 may (e.g., axially and/or radially) abut first section 320 of the first gage part 302. In addition, section 322 of the first gage part may be received by outer race 124 of the bearing 104. In one example, bearing part (e.g., plastic cone) 324 may be connected (e.g., made unitary and/or attached) with (e.g., metallic) portion 326 of the first gage part 304. For instance, section 322 of the first gage part 302 may comprise (e.g., oblique and/or angular) interface portion 328 (e.g., of the bearing part 324) for receipt by (e.g., oblique and/or angular) interface portion 330 of the outer race 124 of the bearing 104. The outer race 124 of bearing the 104 may be (e.g., axially and/or radially) received by (e.g., shoulder 172 of) housing 108. In another example, bearing part 318 may be located in the position depicted for outer race 124 of bearing 104, and vice versa. Further, the housing may be received by (e.g., a portion of) bearing 102. For instance, the housing may include shoulder 174 for (e.g., axially and/or radially) abutting outer race 114 of the bearing 102.

Still referring to FIG. 3, gage part 302 and/or gage part 304 may have relatively (e.g., very) small clearances, such as for maintaining alignment and/or concentricity (e.g., relative to axis 150) of a number of parts of bearing assembly 100 and/or press 208. For instance, section 322 of the gage part 302 may have a (e.g., conical) surface shaped to relatively closely fit into (e.g., the bore of) outer race 124 of bearing 104. In one example, the gage part 304 may be fitted with a protruding pin (not shown). The gage part 302 may be configured with a mating slot and/or an internal groove (not shown) such as for mating, aligning, and/or receiving the protruding pin (not shown) of the gage part 304. This may serve to keep the gage parts 302 and 304 from becoming separated, such as during handling, and/or may serve to keep foreign material (e.g., dirt and/or dust) from entering a (e.g., very) small (e.g., diametrical) clearance (e.g., 0.0008 inches) between the gage parts 302 and 304.

Figure 4:
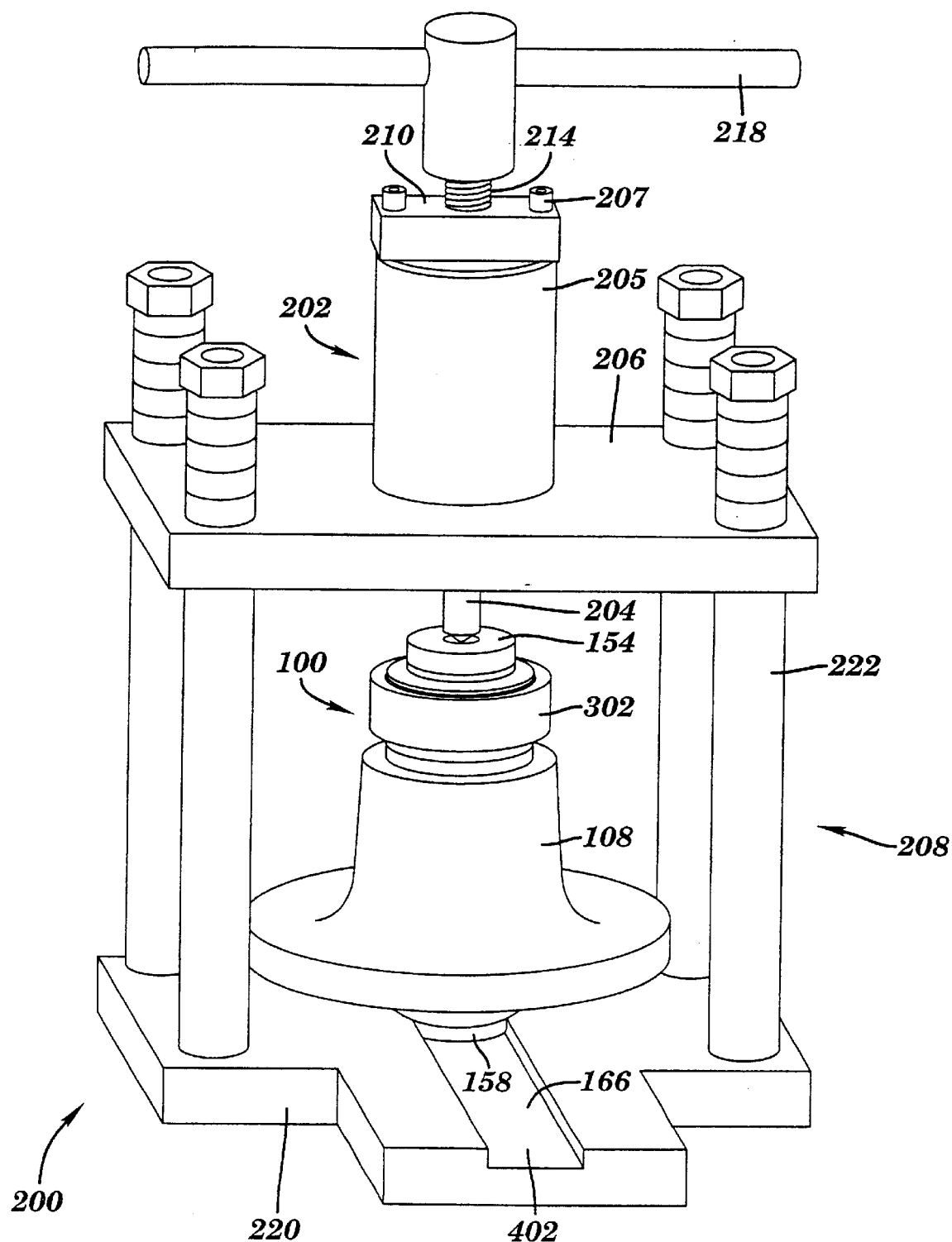
FIG. 4 is a partial, perspective view of the system of FIG. 3.

Referring to FIGS. 3–4, additional description of exemplary operation of system 200 is now presented for explanatory purposes. Stem 158 may be positioned in recess 166 of base 220 in press 208. Inner race 112, having roller elements 116 thereon, may be placed on the stem. Housing 108, with outer races 114 and 124 positioned therein, may be placed over the roller elements 116 (e.g., by coupling the outer race 114 therewith). In one example, the housing may be rotated (e.g., spun), such as for seating the roller elements 116. End 138 of spacer 110 may be placed (e.g., partially about the stem and) on the inner race 112. Section 322 of gage part 302 (e.g., with bearing part 318 seated therein) may be placed (e.g., seated) on the outer race 124, in the housing 108. In addition, section 316 of gage part 304 may be inserted over end 139 of the spacer 110. Inner race 122 (e.g., with roller elements 126 coupled therewith and/or therein) may be placed on section 314 of the gage part 304. Retainer 154 may be placed on the inner race 122. The retainer may be pressed toward the base of the press, while rotating (e.g., turning and/or spinning) the housing, such that is for providing the desired adjustment (e.g., preload and/or compression) to the spacer. This pressing of the retainer toward the base may be stopped (e.g., halted) as soon as a relatively light rotating (e.g., turning) drag (e.g., torque) of the housing is sensed. In one example, the relatively light rotating (e.g., turning) drag (e.g., torque) of the housing may result from a closure among (e.g., one of more gaps among) a plurality of elements in system 200. For instance, the relatively light rolling (e.g., rotating and/or turning) drag (e.g., torque) of the housing may result from a closure (e.g., a gap) between roller elements 126 and bearing part 318 received in section 320 of gage part 302, and/or a closure (e.g., of a gap) between the section 322 of the gage part 302 and the outer race 124 received in the housing 108. This sensing of the relatively light rotating (e.g., turning) drag (e.g., torque) of the housing may serve to indicate a completion of the providing of the desired adjustment to the spacer.

In one example, referring to FIG. 4, base 220 may include a (e.g., elongated) portion 402. For instance, the portion 402 may allow bearing assembly 100 to be located (e.g., stacked) on stem 158 with retainer 154 located (e.g., placed) on the bearing assembly 100. In addition, portion 402 may allow the retainer 154 (e.g., on the bearing assembly 100 on the stem 158) to be slid into a position (e.g., under platform 206) so that the retainer 154 may (e.g., selectively) receive and/or abut one or more force application members such as hydraulic force application member 202 and/or force transmission member 204 (e.g., to provide the desired adjustment to spacer 110, FIGS. 2–3 and 6–7, of the bearing assembly 100), as described herein.

Figure 5:
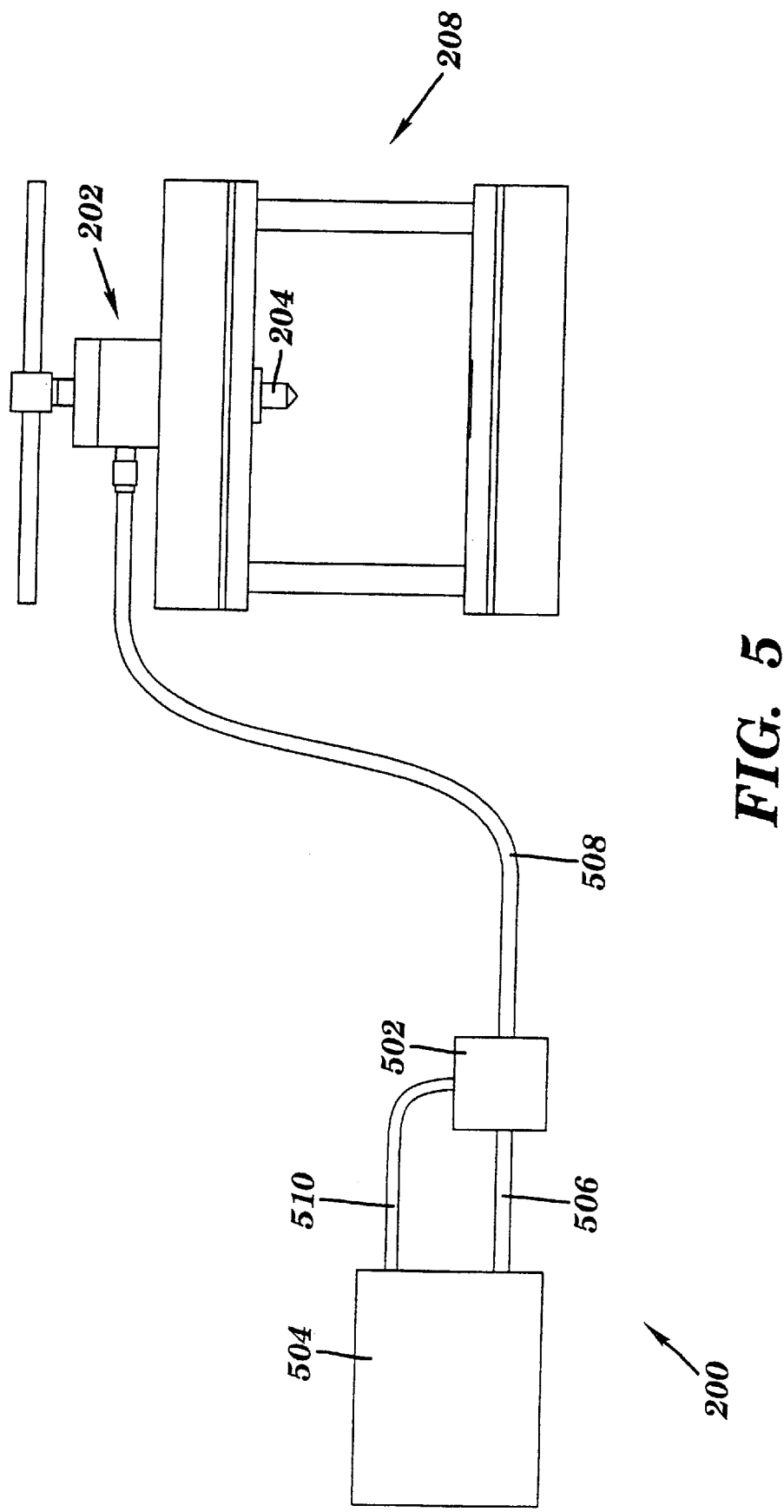
FIG. 5 is a cutaway, partial, elevation, side view of one example of a system for adjusting an adjustable spacer of a bearing assembly, illustrating a hydraulic force application member configured for hydraulic operation and a force transmission member configured for threaded rotation, with a flow regulator in fluid communication with the hydraulic force application member.

Turning to FIG. 5, system 200 may include a flow regulator (e.g., a pressure relief valve) 502. The flow regulator may be in fluid communication with hydraulic force application member 202 and a (e.g., motor driven) pump 504. For example, the pump 504 may include a motor drive (not shown) and/or a fluid reservoir (not shown) in communication with the motor drive, such as to supply fluid to move the hydraulic force application member 202 a sufficient distance to reach, abut, and/or press interface portion 312 (FIG. 3) of retainer 154. In addition, the flow regulator may be configured to (e.g., substantially) limit hydraulic pressure (e.g., applied by the hydraulic force application member 202 to the retainer 154, FIGS. 3–4) to a level just below the value needed to (e.g., completely) provide the desired adjustment (e.g., preload and/or compression) to spacer 110 (FIGS. 2–3 and 6–7). For instance, the flow regulator may be configured to (e.g., substantially) limit force, provided to the spacer by operation of the hydraulic force application member, to a level less than required (e.g., without operation of force transmission member 204), to complete the desired adjustment to the spacer. In one example, the pump may supply fluid under (e.g., a certain and/or variable) pressure through a first conduit (e.g., tube) 506 (e.g., coupled with the pump), the flow regulator, and a second conduit (e.g., tube) 508 coupled with the flow regulator and the hydraulic force application member. For instance, the flow regulator, when the pressure in the conduit 506 exceeds a certain level, may bleed off the excess pressurized fluid into a third conduit (e.g., tube) 510 coupled with the flow regulator and the pump.

Turning to FIGS. 6–7, system 200 may include a force application member 602. For instance, the force application member 602 may comprise a (e.g., extension and/or pull) cylinder, a hydraulic (e.g., pneumatic) force application member, and/or a screw mechanism. In one example, the force application member 602 may include a drive unit (e.g., a lifting device and/or a pressing device) 604 operatively connected with an elongate member 606, such as for providing (e.g., selective and/or forcible) extension and/or retraction of the elongate member 606. The force application member 602 may be connected with (e.g., mounted to) a portion of platform 206 and/or base 220. A plate (e.g., a flange portion) 607 of the force application member 602 may include a passage 608 for (e.g., telescopic and/or sliding) receipt of the elongate member 606. The elongate member 606 may be connected (e.g., attached and/or formed integrally) with a stop 610. A resilient member (e.g., spring) 612 may be located about the elongate member and/or (e.g., sandwiched) between the stop and the plate. In one example, the stop 610 may be located toward the base 220 relative to the plate 607. For instance, the resilient member 612 may abut the stop 610 and/or the plate 607.

Referring to FIGS. 6–7, force application member 602 may serve (e.g., in combination and/or cooperation with force transmission member 204 and/or hydraulic force application member 202) to decrease a possibility for operator error and/or a required level of operator skill. In one example, referring to FIGS. 2–4 and 6–7, platform 206 and base 220 may represent generally opposite references for directions (e.g., relative to axis 150) of movements and/or force application (e.g., to bearing assembly 100, bearing part 318, retainer 154, housing 108, and/or gage parts 302 and/or 304) in press 208.

Again referring to FIGS. 6–7, an illustrative description of further operation of system 200 is now presented. As described herein, bearing assembly 100 may be located (e.g., placed, positioned, and/or inserted) in press 208. In one example, section 322 of gage part 302 may initially abut (e.g., rest in) outer race 124 of bearing 104. Hydraulic force application member 202 may be extended toward base 220 and applied against retainer 154, such as to fix assembly 100, gage parts 302 and 304, housing 108, retainer 154, and stem 158 from movement relative to (e.g., along) axis 150. Nevertheless, the housing may initially remain free to be rotated on bearing 102. For instance, the housing may be (e.g., manually) rotated (e.g., about three revolutions) to assure proper alignment of roller elements 116.

Still referring to FIGS. 6–7, force application member 602 may be operated and/or activated to move plate 607 toward platform 206. For instance, a surface portion 614 of flange portion 615 of the plate 607 may be abutted with a surface portion 616 of flange portion 618 of gage part 302. This movement of the surface portion 614 of the plate against the surface portion 616 of the gage part 302 toward the platform, 206 may serve to advantageously cause a gap to be created between section 322 of the gage part 302 and outer race 124 of bearing 104.

In one example, referring now to FIG. 6, force transmission member 204 may be extended toward base 220 so elongate member 216 abuts retainer 154. Concurrently, housing 108 may be rotated on bearing 102. In one example, a first force applied by force application member 602 against flange portion 618 of gage part 302 toward platform 206, may remain (e.g., generally, substantially, and/or nearly) constant contemporaneously with a second force applied by the force transmission member 204 against the retainer toward the base. For instance, although the second force applied by the force transmission member may cause drive unit 604 to allow elongate member 606 to move toward the base, resilient member 612 (e.g., supported with stop 610) may cause plate 607 to apply a (e.g., contemporaneous and/or counteracting) force so the flange portion 618 experiences (e.g., substantially) little change in (e.g., effective) force applied there against toward the platform 206.

Again referring to FIG. 6, when the desired adjustment has been made to spacer 110 by moving, for instance, force transmission member 204 against retainer 154 (e.g., abutted with inner race 122, abutted with gage part 304, abutted with the spacer, supported with inner race 112, supported with stem 158, received by base 220), there may be a closure of the gap between section 322 of gage part 302 and outer race 124 of bearing 104 (e.g., previously caused by force application member 602 abutting surface portion 614 of plate 607 against surface portion 616 of the gage part 302 in a direction generally opposite the movement of the force transmission member against the retainer).

Referring now to FIG. 7, in another example, hydraulic force application member 202 may be extended toward base 220 to abut retainer 154. Concurrently, housing 108 may be rotated on bearing 102, such as by using one or more parts of a rotation monitoring unit 702, described herein. For instance, a first force applied by force application member 602 against flange portion 618 of gage part 302 toward platform 206, may remain (e.g., generally, substantially, and/or nearly) constant contemporaneously with a second force applied by the hydraulic force application member 202 against the retainer toward the base. Although the second force applied by the hydraulic force application member may cause drive unit 604 to allow elongate member 606 to move toward the base, resilient member 612 (e.g., supported with stop 610) may cause plate 607 to apply a (e.g., contemporaneous and/or counteracting) force so the flange portion 618 experiences (e.g., substantially) little change in (e.g., effective) force applied there against toward the platform 206.

Referring again to FIG. 7, when the desired adjustment has been made to spacer 110 by moving, for instance, hydraulic force application member 202 against retainer 154 (e.g., abutted with inner race 122, abutted with gage part 304, abutted with the spacer, supported with inner race 112, supported with stem 158, received by base 220), the gap may be closed between section 322 of gage part 302 and outer race 124 of bearing 104 (e.g., previously caused by force application member 602 abutting surface portion 614 of plate 607 against surface portion 616 of the gage part 302 in a direction generally opposite the movement of the hydraulic force application member against the retainer).

Now referring to FIGS. 6–7, when spacer 110 is compressed enough to allow contact between section 322 of gage part 302 and outer race 124 of bearing 104, a (e.g., friction) force may occur that is proportional to an incremental force above the amount of force required to provide the desired adjustment to the spacer. This force may resist rotation of housing 108 on bearing 102 by a relatively large amount, for example, by the forced abutment between the outer race 124 and the section 322, as well as the forced abutment between the surface portion 614 of the plate 607 and the surface portion 616 of the flange portion 618 of the gage part 302. For instance, the forced abutments may lock out the relatively low coefficient of friction initially and/or otherwise allowed to the housing 108 by roller elements 126 of bearing 104. This relatively large resistance to rotation of the housing by the forced abutment between the section 322 and outer race 124 upon completion of the desired adjustment to the spacer (e.g., in conjunction with the forced abutment between the plate 607 and the gage part 302), may allow the providing of the desired adjustment to the spacer to be, for example, readily automated (e.g., halted, operated, and/or controlled by and/or in conjunction with circuitry, logic, computing devices, and/or robotics of and/or coupled with rotation monitoring unit 702). Little or no study, analysis, and/or decision may need to be performed by an operator in order to determine and/or ascertain termination and/or an end point of the providing of the desired adjustment to the spacer, since the relatively large increase in resistance to rotation of the housing may be a readily (e.g., manually, electronically, and/or optically) detectable (e.g., dramatic and/or obvious) event. This may advantageously enable repeatable and/or accurate (e.g., control of) adjustment to the spacer (e.g., such as in mass production situations).

Referring further to FIG. 7, rotation monitoring unit 702 may include a drive element 704 and a rotation observation unit 706. For instance, the drive element may comprise a wheel 708 (e.g., selectively) coupled (e.g., rotatably, drivingly, and/or pressingly abutted) with a first location 709 (e.g., about a circumference of) housing 108. The drive element may be connected with a support 710, connected with (e.g., attached and/or fixed to structural member 222 of) press 208. As will be understood by those skilled in the art, the drive element may include a clutch (not shown) configured to, for example, slip at an increase in drag torque of the housing resulting from the closure of the gap between section 322 of gage part 302 and outer race 124 of bearing 104, as described herein. A drag setting to stop the drive element may be (e.g., much) above a drag on the housing caused by a presence of grease seal 107 in bearing 102, since the rolling drag of bearings 102 and/or 104, in one example, is not the determining closure for the cycle (e.g., since roller elements 126 may be locked out, from rotation of housing 108, at closure of the gap between section 322 of gage part 302 and flange portion 616 of plate 607, as described herein).

Still referring to FIG. 7, rotation observation unit 706 may comprise a rotation sensing unit 711 such as a wheel 712 (e.g., selectively) coupled (e.g., rotatably, drivably, and/or pressibly abutted) with a second location 714 (e.g., about a circumference of) housing 108. The rotation sensing unit may be connected with a support 716 connected with (e.g., attached and/or fixed to structural member 222 of) press 208.

Referring again to FIGS. 6–7 and as will be understood by those skilled in the art, rotation observation unit 706 may be configured to provide (e.g., generate) an indication (e.g., a signal) after rotation sensing unit 711 senses a decrease in (e.g., angular) frequency of rotation of housing 108 (e.g., at the increase in drag torque of the housing, for example, resulting from the closure of the gap between section 322 of gage part 302 and outer race 124 of bearing 104). The indication (e.g., signal) may be employed to control a portion of hydraulic force application member 202 and/or force transmission member 204. For instance, the indication (e.g., signal) provided (e.g., generated) by the rotation observation unit may be employed to terminate an operation of (e.g., a continuation of movement against retainer 154 toward base 220 by) hydraulic force application member 202 and/or force transmission member 204. The indication (e.g., signal) may correspond to, for example, a completion of the providing of the desired adjustment to spacer 110.

Now referring to FIG. 7, automation may be employed so, for instance, the completion of the adjustment to spacer 110 may be indicated such as by providing and/or generating a (e.g., sound and/or light) signal (e.g., to and/or for an operator, user, and/or force control unit of press 208). For instance, rotation monitoring unit 702 may be configured to provide an indication and/or signal (e.g., to a user, operator, and/or control unit coupled with one or more force application members of the press 208 such as hydraulic force application member 202 and/or force transmission member 204, e.g., FIG. 6) upon an (e.g., sensed by rotation observation unit 706) increase in drag torque of housing 108 corresponding to a completion of the adjustment to the spacer, as described herein.

Figure 8:
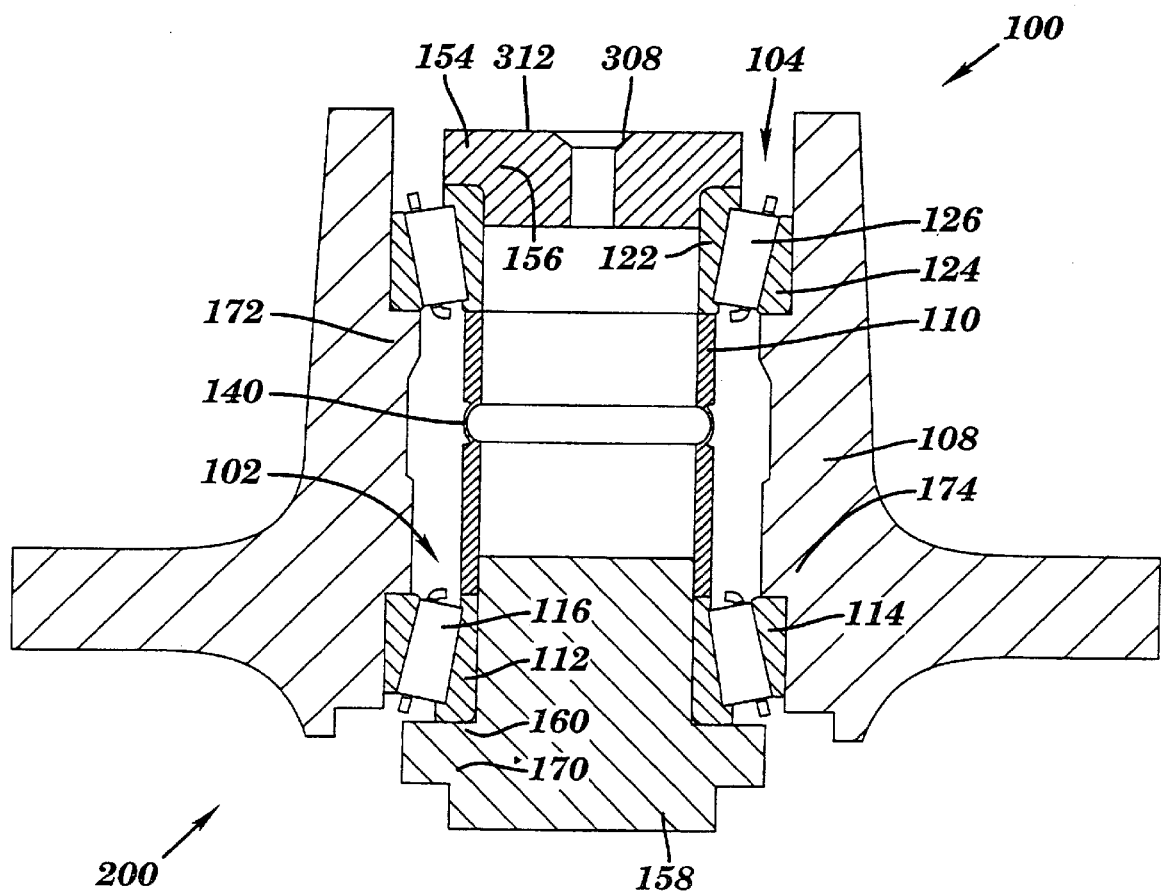
FIG. 8 is a cutaway, sectional, partial, elevation, side view of one example of a system for adjusting an adjustable spacer of a bearing assembly.

Referring to FIGS. 3 and 8, an illustrative description is now presented, for explanatory purposes, regarding a determination (e.g., an adjustment) of an axial (e.g., relative to axis 150) dimension of at least one of, for instance, gage parts 302 and/or 304. For example, a length 350 (FIG. 3) of the gage part 304 may be considered. In one example, the greater (e.g., relative to the axis 150) the length 350 of the gage part 304, the shorter (e.g., relative to the axis 150) a length 352 (FIG. 3) of adjustable spacer 110 may be after the desired adjustment is provided to the spacer. In addition, the greater (e.g., relative to the axis 150) the length 352 of the spacer, the more endplay may be created in bearing assembly 100.

Expression 1, as follows, may describe an adjustment (e.g., a correction) X to, for instance, length 350 of gage part 304, such as for employment in the providing of the adjustment to spacer 110. In one example, the adjustment to the spacer may be provided by using the gage parts 302 and/or 304 in the pressing and/or force application, as described herein. In addition, the spacer may resemble any adjustable spacer 110 described herein and/or in the above-incorporated applications Ser. Nos. 09/108,514, 09/130,166, and/or 09/259,067 and/or U.S. Pat. Nos. 4,067,585 and/or 5,549,397.

$$X = D - (B + P - R)$$ Expression 1 where

X = an adjustment (a correction) to the length 350 of the gage part 304.

$$D = E_G - E_0$$

$E_0$ = endplay measured with spacer 110 in assembly 100 (see, e.g., FIG. 8).

$E_G$ = endplay measured with the same spacer 110 in the same assembly 100 with gage part 304 placed therein (see, e.g., FIG. 3).

B = spacer springback to zero force; a physical characteristic of spacer 110.

P = amount of preload at final installation of the bearing assembly 100 (see, e.g., FIG. 1); a manufacturer specification.

R = amount spacer will be re-compressed at final installation of the bearing assembly 100 (see, e.g., FIG. 1); a manufacturer specification.

Regarding Expression 1, each variable that may serve to increase X, may serve to adjust (e.g., shorten) the length 350 of the gage part 304. In one example, when the gage part 304 has a length 350 which is correct based on the Expression 1, then X=0. Further, if spacer 110 is correctly adjusted based on the Expression 1, then $E_0$=R−P. So, with such a spacer, $E_G = E_0 + B + P - R = B$.

For instance, the determination of length 350 of gage part 304 may begin with the length 350 of the gage part 304 being (e.g., intentionally and/or predicted) too long, according to the Expression 1, so the gage part 304 may be adjusted (e.g., shortened and/or faced off) by the amount X. In another example, if X<0 because D<(B+P−R), then a length 354 (FIG. 3) of gage part 302 may be adjusted (e.g., shortened relative to axis 150). However, an adjustment to the length 350 of the gage part 304, in one example, may represent a relatively easier procedure and/or operation than an adjustment to the length 354 of the gage part 302.

The following exemplary considerations are provided regarding Expression 1, for illustrative purposes. If B=0 (e.g., no springback) and P=R (e.g., no assembly setting), then X=D. Increasing a distance of compression (e.g., crushing) for spacer 110 by decreasing X, may serve to compensate for an amount of springback B. A preload setting for the spacer 110 may be achieved by a decrease in X by an amount P. When a torque applied by fastener (e.g., nut) 132 (FIG. 1) will secure bearing assembly 100 at final installation by re-compressing the spacer by an amount R, gage part 304 may be adjusted (e.g., shortened) by the amount R (e.g., since X may be increased by the amount R).

While parts of the description herein, for explanatory purposes, may imply certain exemplary directions, such directions may be considered relative. As will be appreciated by those skilled in the art, the significance of, for example, a "vertically upward" direction in many environments may stem from its opposition to a dominant "downwardly" acting gravitational force, resulting from the presence of a large mass such as the Earth, with "vertical" approximating radial alignment therewith. Furthermore, a "horizontal" direction and a "vertically upward" direction may be readily ascertained following determination of an appropriate "downward" direction. A number of design choices may allow accommodations of any orientations for any spacers, assemblies, devices, systems, and/or portions thereof.

A force application may serve to cause advantageous effect(s). In one aspect, such force application may cooperate with other force application(s) to achieve desired outcome(s). That is, a certain cause may be a contributor to desired result(s), occupying any of a number of positions within hierarchical arrangement(s) of causation(s) for outcome(s), benefit(s), advantage(s), and/or the like.

As will be appreciated by those skilled in the art, feature (s), characteristic(s), and/or advantage(s) of (e.g., portions of) the system(s), force application and/or transmission member(s), and/or spacer(s) described herein and/or in the above-incorporated application(s) Ser. Nos. 09/108,514, 09/130,166, and/or 09/259,067 and/or U.S. Pat. Nos. 4,067, 585 and/or 5,549,397, may be applied and/or extended to any embodiment (e.g., and/or portion thereof).

Although preferred embodiments have been depicted and described in detail herein, it will be apparent to those skilled in the relevant art that various modifications, additions, substitutions, and the like can be made without departing from the spirit of the invention and these are therefore considered to be within the scope of the invention as defined in the following claims.

What is claimed is:

1. A bearing assembly adjustable spacer adjustment system, comprising:
   a hydraulic force application member abuttable with a retainer receivable by a bearing portion of a bearing assembly, said bearing assembly including an adjustable spacer, said bearing assembly supported with a base; and
   a force transmission member abuttable with said retainer;
   wherein a first movement of said hydraulic force application member, toward said base and by an operation of said hydraulic force application member when said hydraulic force application member abuts said retainer and when said retainer is received by said bearing portion, causes a first stage of a desired adjustment to be provided to said adjustable spacer;
   wherein a second movement of said force transmission member, toward said base and by a threaded rotation of said force transmission member when said force transmission member abuts said retainer and when said retainer is received by said bearing portion, causes a second stage of said desired adjustment to be provided to said adjustable spacer.

2. The system of claim 1, wherein said force transmission member includes a first threaded portion, and further comprising an interconnector having a second threaded portion engaged with said first threaded portion.

3. The system of claim 2, wherein said interconnector is fixedly connected with at least one of said base and a portion of said hydraulic force application member.

4. The system of claim 1, wherein said force transmission member comprises an elongate member connected with an arm portion extending transversely relative thereto, said arm portion configured to be operated to rotate said elongate member in driving said rotation of said force transmission member.

5. The system of claim 1, wherein said hydraulic force application member comprises a hydraulic sleeve having a passage therethrough, and wherein said force transmission member comprises an elongate member having a portion located in said passage.

6. The system of claim 1, wherein said base supports a stem, a section of said stem receiving a second bearing portion of said bearing assembly.

7. The system of claim 6, wherein said base includes a surface portion having a recess receiving a second section of said stem.

8. The system of claim 1, wherein said hydraulic force application member is operatively arranged effectively substantially in parallel with said force transmission member.

9. The system of claim 1, wherein a housing portion of a housing is rotatable on a second bearing portion of said bearing assembly contemporaneously with a portion of said second movement of said force transmission member.

10. The system of claim 1, wherein said adjustment includes at least one of a preload, an adjustment to an axial dimension of said spacer, and a compression.

11. The system of claim 1, further comprising a flow regulator in fluid communication with said hydraulic force application member.

12. The system of claim 11, wherein said flow regulator is configured to substantially limit force, provided to said spacer by said operation of said hydraulic force application member, to a level less than required, without said second movement of said force transmission member, to cause the providing of said second stage of said adjustment to said spacer.

13. The system of claim 1, further comprising a gage part locatable between said bearing portion and said spacer, wherein said first movement of said hydraulic force application member and said second movement of said force transmission member, when said retainer is received by said bearing portion and when said gage part is located between said bearing portion and said spacer, causes force to be transmitted through said gage part in the providing of said first and second stages of said adjustment to said spacer.

14. The system of claim 1, further comprising:
   a first gage part including a first gage section, a second gage section, and a first surface portion located therebetween, said first gage section receiving a first bearing part coupled with said bearing portion;
   a second gage part including a third gage section and a fourth gage section, said third gage section abutting said bearing portion, said fourth gage section abutting said spacer; and a second force application member including a second surface portion;

wherein said second movement of said force transmission member, in a first direction toward said base and when said force transmission member abuts said retainer, contemporaneous with a second operation of said second force application member, in a second direction generally opposite said first direction and with said second surface portion abutting said first surface portion generally in said second direction, causes a gap, between said second section of said first gage part and a second bearing part supported with said base, until a completion of the providing of said second stage of said adjustment to said spacer.

15. The system of claim 14, further comprising a drive element, said drive element coupled with a housing rotatable on a second bearing portion of said bearing assembly, said housing abutting said second bearing part, said drive element including a portion configured to slip at an increase in drag torque of said housing resulting from a closure of said gap between said second section of said first gage part and said second bearing part.

16. The system of claim 15, further comprising a rotation observation unit, said rotation observation unit coupled with said housing and configured to provide an indication after sensing a decrease in frequency of rotation of said housing.

17. A bearing assembly adjustment system, comprising:
a first gage part including a first gage section, a second gage section, and a first surface portion located therebetween, said first gage section receiving a first bearing part coupled with a bearing portion of a bearing of a bearing assembly, said bearing portion receiving a retainer abuttable with a first force application member, said bearing assembly including an adjustable spacer, said bearing assembly supported with a base;

a second gage part including a third gage section and a fourth gage section, said third gage section abutting said bearing portion, said fourth gage section abutting said adjustable spacer; and a second force application member including a second surface portion;

wherein a first operation of said first force application member, in a first direction toward said base and when said first force application member abuts said retainer, contemporaneous with a second operation of said second force application member, in a second direction generally opposite said first direction and with said second surface portion abutting said first surface portion generally in said second direction, causes a gap, between said second section of said first gage part and a second bearing part supported with said base, until a desired compression is provided to said adjustable spacer.

18. The system of claim 17, wherein said compression comprises at least one of a preload of said spacer and an adjustment to an axial dimension of said spacer.

19. The system of claim 17, wherein the coupling of said first bearing part with said bearing portion comprises a rotatable connection of said first bearing part with said bearing portion.

20. The system of claim 17, wherein said first operation of said first force application member contemporaneous with said second operation of said second force application member, upon a completion of the providing of said compression to said spacer, causes said second section of said first gage part to abut said second bearing part.

21. The system of claim 17, wherein said abutting of said second surface portion with said first surface portion substantially prevents rotation, contemporaneous therewith, of said first gage part relative to an axis thereof.

22. The system of claim 17, wherein said bearing portion and said second bearing part comprise said bearing.

23. The system of claim 17, wherein said bearing portion and said first bearing part comprise said bearing.

24. The system of claim 17, wherein said second surface portion comprises a flange portion of said second force application member.

25. The system of claim 17, wherein said first surface portion comprises a flange portion of said first gage part.

26. The system of claim 17, wherein said third gage section includes a shoulder portion that receives said bearing portion.

27. The system of claim 17, where in said second force application member includes a drive unit, an elongate member, a plate, a resilient member, and a stop, said drive unit operatively connected with said elongate member, said plate including said second surface portion and a plate part having a passage therethrough, a portion of said elongate member located in said passage, said stop connected with said elongate member, said resilient member located between and in abutment with at least one of said plate and said stop.

28. The system of claim 17, wherein said spacer abuts a second bearing portion of a second bearing of said bearing assembly, said second bearing portion received by a stem supported with said base.

29. The system of claim 28, wherein said second bearing portion is rotatably connected with a third bearing portion of said second bearing, said third bearing portion receiving a first housing portion of a housing, said second bearing part received by a second housing portion of said housing.

30. The system of claim 29, wherein said housing is, contemporaneously with at least one of said first operation of said first force application member and said second operation of said second force application member, rotatable, in said gap and on said second bearing, until a completion of the providing of said compression to said spacer.

31. The system of claim 29, further comprising a rotation sensing unit operatively coupled with said housing.

32. The system of claim 29, further comprising a drive element drivingly coupled with said housing.

33. The system of claim 32, wherein said drive element includes a portion configured to slip at an increase in drag torque of said housing resulting from a closure of said gap between said second section of said first gage part and said second bearing part.

34. The system of claim 33, wherein said increase in drag torque corresponds to a completion of the providing of said compression to said spacer.

35. The system of claim 32, further comprising a rotation observation unit coupled with said housing, said rotation observation unit configured to provide an indication after sensing a decrease in rotation frequency of said housing, wherein said indication is employed to terminate said first operation of said first force application member.

36. The system of claim 29, further comprising a rotation observation unit coupled with said housing, said rotation observation unit configured to generate a signal to control a portion of said first force application member.

37. The system of claim 17, wherein said first operation of said first force application member comprises at least one of a threaded rotation and a hydraulic movement of a portion of said first force application member.

* * * * *